Patented Dec. 19, 1933

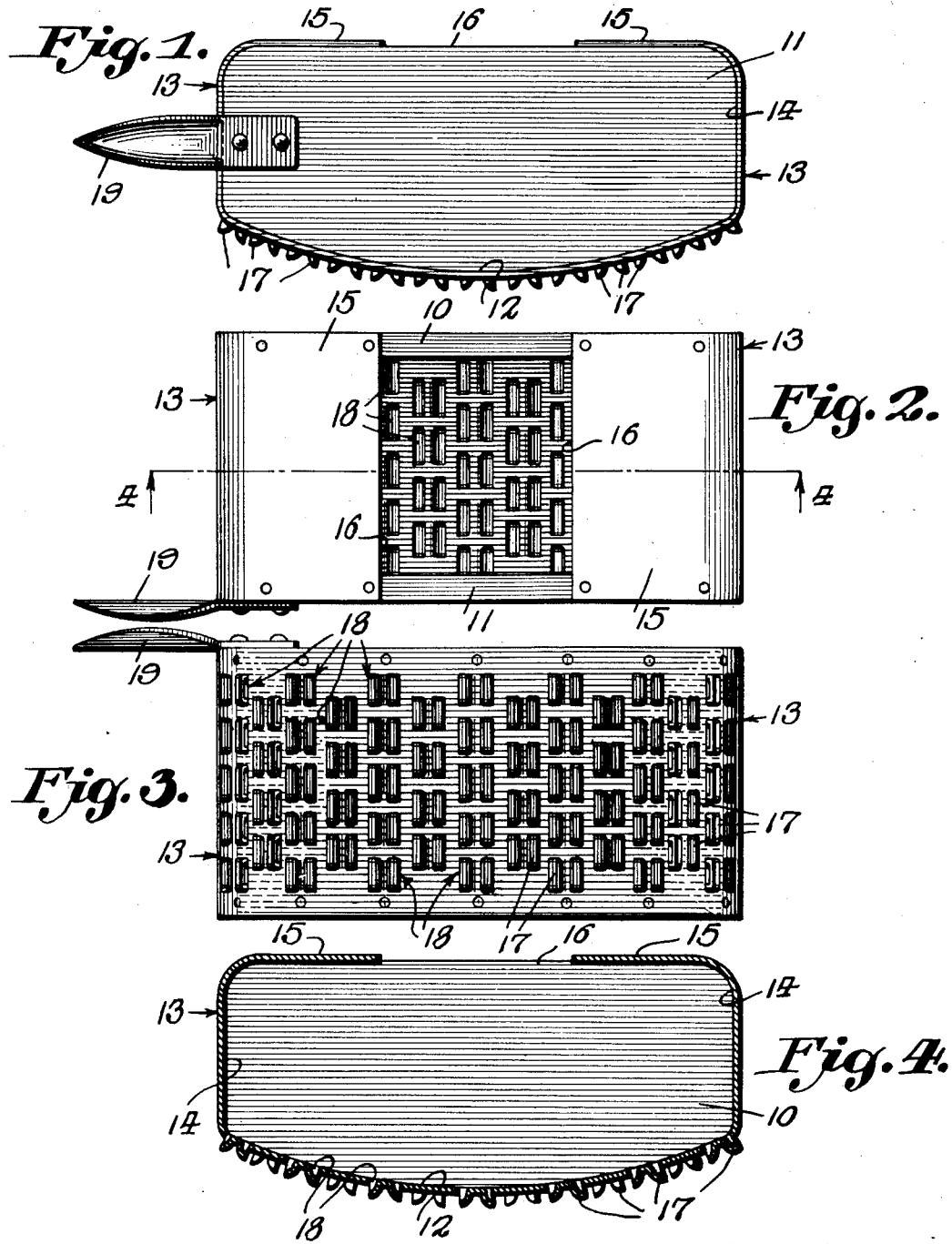

1,940,131

UNITED STATES PATENT OFFICE 1,940,131

VEGETABLE PEELER

George J. Janosko, Anaconda, Mont.

Application December 8, 1930. Serial No. 500,844

1 Claim. (Cl. 146—50)

This invention relates to kitchen utensils, and has for one of its objects to provide a convenient and useful implement consisting of a vegetable grater, and a receptacle in which the grated material is gathered as the grating proceeds and from which it may be easily removed.

Another object of the invention is to provide a combined grater, receptacle for the grated materials, and vegetable paring knife attached to the body of the receptacle.

With these and other objects in view, the invention consists substantially in the construction herein shown and described and defined by the claim, and in the drawing illustrative of the preferred embodiment of the invention in which:

Figure 1 is a side elevation.

Figure 2 is a top plan view, and

Figure 3 is a bottom plan view of the improved utensil.

Figure 4 is a longitudinal section on the line 4—4 of Figure 2.

The device includes in general a receptacle for the grated material having a bottom formed with a plurality of open grating slots and an opening in the top through which the grated material may be removed.

The receptacle or body of the device is formed with spaced sides 10 and 11 which may be of wood and curved longitudinally as at 12. Bearing upon the sides 10 and 11 is a relatively long plate represented as a whole at 13 and of sufficient length to be attached to the curved lower edge 12, the ends 14, and to extend for a certain distance toward the center of the sides 10 and 11 as at 15, leaving an open space 16 between the terminals as shown. The portion of the plate 13 which engages the curved portion 12 of the sides 10 and 11, is punctured inside to form outwardly directed projections 17, thus forming a grating surface with spaced openings 18 communicating with the interior of the receptacle as indicated in Fig. 4.

By this means a longitudinally curved grating surface is produced with one of the openings 18 next to each of the projections 17, so that when the implement is drawn over the vegetable to be grated, or the vegetable drawn over the grating portion, the vegetable will be finely divided and the grated particles forced through the openings 18 into the interior of the receptacle from which they may be removed through the opening 16 as before described.

Attached to one of the sides 10 or 11 is a pointed blade 19 which forms a convenient knife to be used for paring the vegetables to be grated.

The implement is simple in construction, inexpensive to manufacture, and will be found very useful and convenient as an adjunct to the outfit of the kitchen.

The whole implement may be of metal, or partly of wood and partly of metal, and of any suitable size or capacity.

Having now described my invention, that which I claim to be new and desire to secure by Letters Patent is:

A grating device comprising a box-like structure including a pair of parallel walls each having a lower longitudinally arcuate edge face, a sheet of stiff material secured to the said arcuate faces, and extending between and spacing said walls apart, the ends of said sheet being secured to the ends of said walls and to the tops thereof and terminating in spaced relation to provide an opening into said structure, the arcuate face contacting portion of said sheet being formed with a plurality of staggered series of pairs of parallel slots extending transversely thereof, and grating projections struck from said slots to extend beyond the convex face of said contacting portion and arranged in pairs, the projections of each pair diverging from each other and away from said convex face.

GEORGE J. JANOSKO.